July 10, 1934.  T. HANSEN  1,966,244
WELDED RESERVOIR
Filed Feb. 27, 1932    2 Sheets-Sheet 1

INVENTOR.
Thorvald Hansen
BY
ATTORNEY.

July 10, 1934.   T. HANSEN   1,966,244
WELDED RESERVOIR
Filed Feb. 27, 1932   2 Sheets-Sheet 2
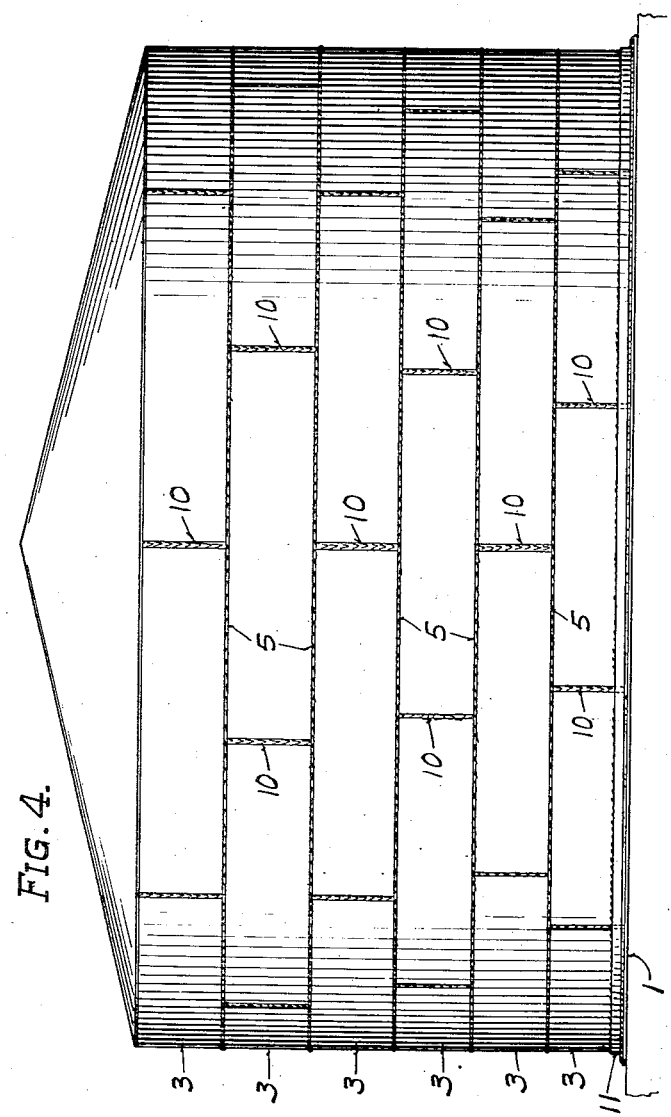
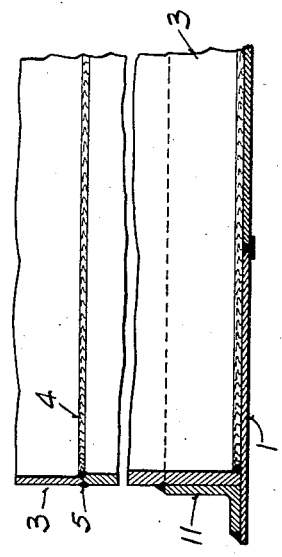
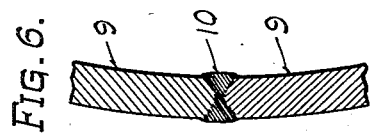
INVENTOR.
Thorvald Hansen
BY
ATTORNEY.

Patented July 10, 1934

1,966,244

UNITED STATES PATENT OFFICE 1,966,244

WELDED RESERVOIR

Thorvald Hansen, Wauwatosa, Wis., assignor to A. O. Smith Corporation, Milwaukee, Wis., a corporation of New York Application February 27, 1932, Serial No. 595,555

5 Claims. (Cl. 220—5)

This invention relates to reservoirs of large capacity for storing liquids and to the method of constructing them.

An object of the invention is to provide a reservoir of large capacity, constructed from steel plates joined by welding, for storing water or other liquid.

Another object of the invention is to provide a welded steel reservoir in which the steel is utilized in an efficient manner to resist the stresses set up in the reservoir when it is filled with liquid.

A further object of the invention is to provide a simple and efficient method of constructing a steel reservoir.

In accordance with the present invention, a large open end reservoir of cylindrical shape, suitable for use as a water tower, is constructed by disposing rings or hoops of steel, one upon another, to form the wall of the reservoir. Each hoop or ring of steel is formed from curved steel plates of convenient size disposed end-to-end and joined by welding to constitute an integral structure. The welds are so formed as to be of strength equal to the strength of the plates and the plates in each ring are designed to resist the hoop stresses set up in the ring by the hydrostatic pressure exerted on the ring by liquid in the reservoir when the reservoir is full.

Each ring is so designed that the metal in it is subjected to a maximum predetermined safe working stress and consequently the plates from which the upper ring is formed may be made quite thin while rings successively lower in the structure are made of increasingly greater thickness to withstand the stresses set up by the greater head of liquid to which they are subjected.

Inasmuch as there is practically no vertical stress in a reservoir open at its upper end, the successive rings need not be joined in such manner as to resist tension stress. However, in order to make the structure liquid tight, weld metal is deposited on the inside of each seam between adjacent rings and preferably also on the outside of each seam.

The foregoing and other objects of the invention will be more readily appreciated upon reading the following detailed description in connection with the accompanying drawings, of which:

Fig. 4 is a view in side elevation of a reservoir embodying a modification of the invention;

Fig. 5 is a view in vertical section of portions of one wall of the reservoir showing the sealing welds; and Fig. 6 is a view in horizontal section of a portion of the reservoir taken through a vertical joint showing the manner in which the curved plates are joined end-to-end by welding.

Figure 1:
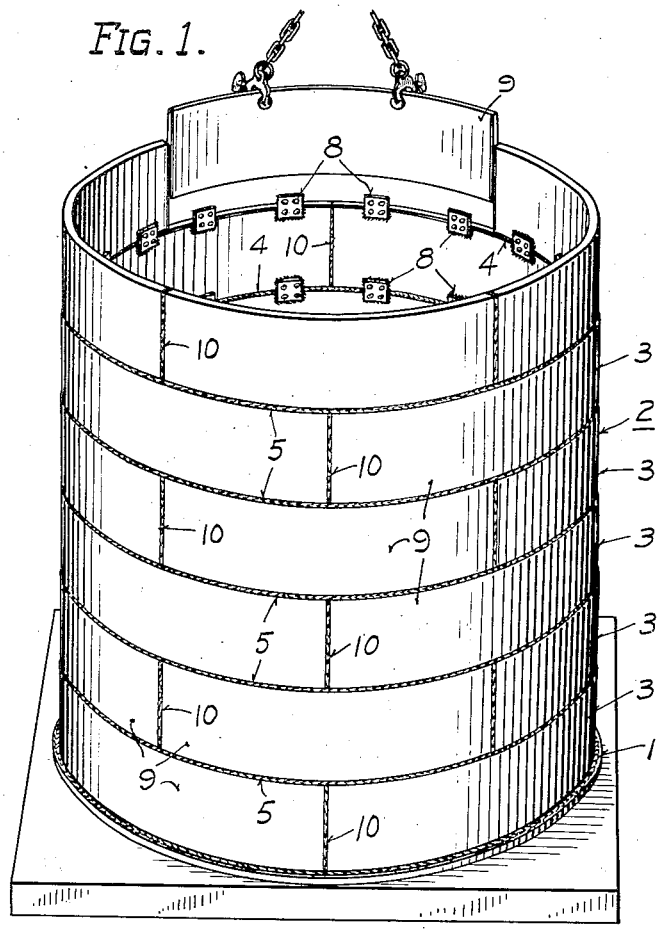
Figure 1 is a view in perspective of a welded reservoir embodying the invention showing a plate being placed in position.

Referring more particularly to the drawings, the structure shown in Fig. 1 comprises a base 1 of suitable nature on which is mounted the body portion 2 of a fabricated steel cylindrical reservoir of comparatively large dimensions. As shown, the body portion 2 of the reservoir is made up of a plurality of rings or hoops 3 of steel disposed in superposed relation. Each ring 3 is designed to withstand the hoop stresses set up within it by hydrostatic pressure acting radially outward on the ring when the reservoir is full of liquid.

In order that the steel from which the hoops are made may be utilized in most efficient manner, each hoop 3 is designed of such thickness that when the maximum hoop stress resulting from hydrostatic pressure is set up within it, the steel will be stressed substantially to a predetermined maximum working stress. Consequently, the hoops 3 may be made of diminishing thickness from the bottom hoop to the top hoop of the structure.

Inasmuch as the hydrostatic pressure of the wall 2 of the reservoir acts in horizontal direction only, there is no necessity for joining one hoop 3 to the adjacent hoop in a manner to resist tension stresses. However, in order to prevent leakage of liquid through the joints between adjacent rings, the joints are sealed in liquid tight manner preferably by depositing a bead 4 of weld metal along the inner joining edges of adjacent rings. The bead 4 is made continuous around the reservoir to prevent passage of liquid into the joint between the rings. To make the joint more secure and to prevent entrance of moisture between successive rings from the outside of the reservoir, a second bead of weld metal 5 may be deposited circumferentially of the wall 2 at the outer meeting edge of each joint between rings.

Figure 2:
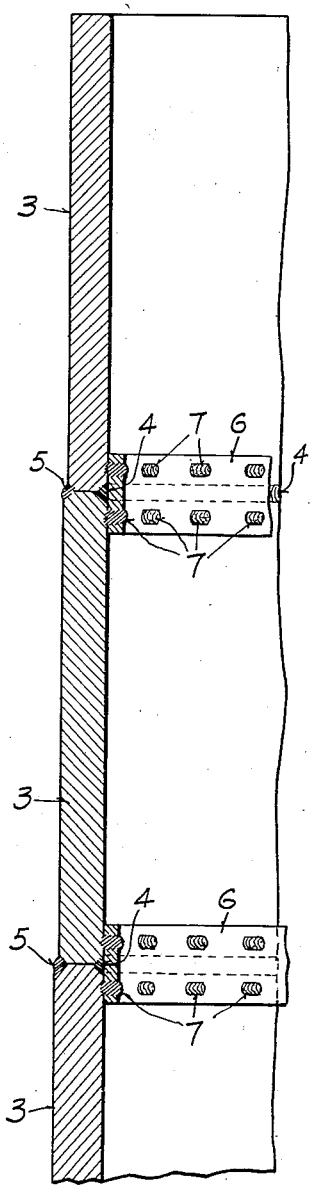
Fig. 2 is a view in vertical section of a portion of the wall of the reservoir showing the manner in which the sealing welds are made.

If it is desired to further strengthen and seal the joints between the rings, butt straps 6 may be placed continuously around the wall at the joints between rings in such manner as to overlap the joints. The straps 6 are preferably attached to the rings by weld metal which may be deposited as shown in Fig. 2 through openings in the strap to form key-hole welds 7. The openings for the key-hole welds 7 are preferably spaced in such manner that some communicate with one ring and some with the other ring to be joined. Under some circumstances, it may be preferable to utilize, instead of continuous butt straps, short spaced butt plates 8, such as are shown on the inside of the reservoir in Fig. 1.

Figure 3:
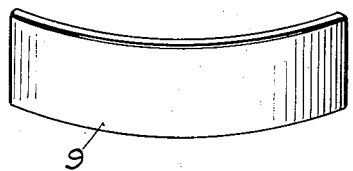
Fig. 3 is a view in perspective of one of the curved plates used in constructing the reservoir.

Each ring 3 of the reservoir is formed from curved steel plates 9, of the type shown in Fig. 3, disposed end-to-end and joined by welding to form a continuous circular wall. The plates 9 are made of size convenient for shipping and handling at the site of the reservoir. The longitudinal edges of the plates are preferably planed or otherwise machined to accurate shape and the ends chamfered to provide welding grooves by suitable machinery in the shop prior to shipping them to the construction site. If the plates are of thick material, they are preferably also bent to the required degree of curvature in the shop, but if the plates are relatively thin, they may be bent to the curvature of the wall during the fabrication of the structure.

If the reservoir to be constructed is of comparatively small diameter, the curved plates 9 may be welded end-to-end while disposed in horizontal position to form a ring extending in a vertical plane. The completed ring may then be lifted by a crane or other suitable apparatus to horizontal position to form a portion of the reservoir.

In constructing reservoirs of large diameter, the curved plates 9 are disposed on edge on the base 1 end-to-end to form the lower ring of the reservoir and held in position by any suitable means. The individual plates 9 are then joined at their contiguous ends by welded seams 10 formed by welding in vertical direction to constitute an integral ring. The welds 10 are so made that they are of strength substantially equal to the strength of the steel plates 9 in accordance with modern welding practice.

The plates 9 constituting the second ring of the reservoir wall are then disposed on edge on top of the first ring, preferably with their ends staggered relative to the vertical joints of the first ring. The plates of the second ring may be held in position by tack welding them to the first ring, or the sealing weld beads 4 and 5 may be deposited for the purpose of holding them in position. The vertical welds 10 are then made to join the plates of the second ring into an integral structure. The other superposed rings are formed successively in like manner.

Near the top of the structure the plates 9 may be of such comparatively thin material that it is not necessary to bend them to arcuate shape in the shop. In such case flat plates are utilized and are bent into arcuate shape as they are placed in position on top of the ring last completed. After the plates are bent, or while they are being bent to shape, they may be tack welded to the top surface of the ring beneath them to hold them in position.

The butt straps 6 or butt plates 8 may be welded in position either after the entire structure has been completed or during the erection of the structure after the sealing welds 4 have been made.

In accordance with another method of erecting the reservoir, the plates 9 are guided into position by the butt plates 8, as shown at the top of Fig. 1. By this method, after a ring 3 is completed, the butt plates 8 are welded to its upper portion by key-hole welds or marginal welds or both, in such position that substantially half of each butt plate projects above the edge of the ring. One of the plates to be embodied in the next ring is then lifted by a suitable hoist, as shown, and placed in position by moving it into contact with the projecting butt plates 8 and lowering it, while guided by the butt plates, on to the previously completed ring. The plate 9 is then tacked in position by depositing weld metal through the holes in the butt plates or between the edges of the butt plates and the face of the curved plate. The other plates 9 are placed in position and tack welded to the butt plates in like manner to complete the ring.

The vertical seams 10 joining the contiguous ends of the plates are then made. After the ring is completed, the sealing welds 4 and 5 are deposited to close the joint between it and the ring below. In making the inner sealing weld 4, it is necessary to weld entirely around each of the butt plates 8.

In some structure, the butt straps or plates may be dispensed with entirely and the sealing welds 4 and 5 depended upon for holding the superposed rings in alignment. A specific structure made in this manner is illustrated in Fig. 4. The structure there represented is a water reservoir of three million gallons capacity. This reservoir is approximately one hundred feet in diameter and fifty-one feet in height from the bottom of the reservoir to the top of the reservoir wall. The wall is formed of six superposed rings mounted on a base 1 formed of steel plates welded together to constitute the bottom of the reservoir.

As shown in detail in Fig. 5, the lower ring 3 is held in position on the base 1 by means of a curved angle or L-shaped structural member 11 disposed outside of the ring 3 with one leg welded to the base plate 1 and the other leg welded to the ring 3. The lower ring 3 may be made up of ten plates each $1\frac{1}{16}$ inch thick, 96 inches wide, and approximately $31\frac{1}{2}$ feet long. The second ring may be formed from nine plates each of the same width but of $\frac{7}{8}$ inch thickness and approximately 35 feet long. The third ring may be formed from nine plates each $\frac{3}{4}$ inch thick and 96 inches wide by approximately 35 feet long. The remaining rings may be formed of wider and thinner material, for example the fourth and fifth rings each may be 108 inches wide formed from eight plates each approximately $39\frac{1}{2}$ feet long and of $\frac{9}{16}$ and $\frac{3}{8}$ inch thicknesses, respectively. The sixth and top ring may be formed from eight plates each 109 inches wide of $\frac{3}{8}$ inch steel substantially $39\frac{1}{2}$ feet long. The plates in each ring are joined at their ends by vertical welds of the type shown in Fig. 6.

As shown in Fig. 4, the rings 3 are disposed on each other in such manner that the outside surfaces are lined up to form a smooth exterior of the reservoir for the sake of appearance. The inner surfaces of the successive layers are offset to take account of the difference in thickness of the successive rings. The offset joints are smoothed and sealed by the inner sealing weld 4.

Although I have described only two specific embodiments of the invention, others skilled in the art to which this invention relates will appreciate the fact that modifications of the structures disclosed herein may be constructed without departing from the spirit and scope of the invention as defined in the appended claims.

I claim:

1. A reservoir comprising a base, curved thick steel plates disposed on edge on the base and joined by welding to constitute a continuous wall for confining liquid, curved steel plates of less thickness disposed on edge on the first plates and joined by welding to constitute a superposed continuous wall, and a deposit of weld metal disposed at the inner meeting edges of the walls constituting a continuous liquid tight seal between them.

2. A reservoir of large capacity, comprising a horizontal base, a plurality of curved thick steel plates disposed on edge on the base and joined at their ends by welding to constitute a continuous circular wall, other curved steel plates thinner than the next lower plates disposed on edge on said thick plates in superposed layers, the plates in each layer being joined by welding to constitute a continuous circular wall, the plates of each circular wall being of such thickness as to withstand the tension stresses set up in it by liquid in the reservoir when filled to the top, and a deposit of weld metal sealing the joints between the circular walls and between the wall and the base.

3. A reservoir comprising a base, curved thick steel plates disposed on edge on the base and joined by welding to constitute a continuous wall for confining liquid, curved steel plates of less thickness disposed on edge on the first plates and joined by welding to constitute a superposed continuous wall, means to prevent lateral movement between the superposed walls, and a relatively light deposit of weld metal disposed at the meeting edges of the walls constituting a continuous liquid tight seal between them.

4. A reservoir of large capacity comprising a base, successive circular bands of curved steel plates disposed on edge, the first band on the base and each succeeding band on the upper edge of the previous band, the plates of each successive band being welded together to constitute a continuous circular wall-band for confining liquid, said wall-bands being constructed of thinner plates as the erection proceeds in the direction of the top of the reservoir, the thickest wall-band being at the bottom and the thinnest at the top of the reservoir, means to prevent lateral movement between the superposed wall-bands, and a relatively light deposit of weld metal disposed at the meeting edges of the bands constituting a continuous liquid tight seal between them.

5. A reservoir of large capacity comprising a base, successive circular bands of curved thick steel plates disposed on edge, the first band on the base and each succeeding band on the upper edge of the previous band, the plates of each successive band being welded together to constitute a continuous circular wall-band for confining liquid, said wall-bands being constructed of thinner plates as the erection proceeds in the direction of the top of the reservoir, the thickest wall-band being at the bottom and the thinnest at the top of the reservoir, and a relatively light deposit of weld metal disposed at the meeting edges of the bands constituting a continuous liquid tight seal between them.

THORVALD HANSEN.